United States Patent
Ek

[11] Patent Number: 5,453,376
[45] Date of Patent: Sep. 26, 1995

[54] COMPOST CHAMBER

[76] Inventor: J. Edwin Ek, 5161 S. Marion, Tulsa, Okla. 74135

[21] Appl. No.: 181,921

[22] Filed: Jan. 14, 1994

[51] Int. Cl.[6] ............ C12M 1/10; C12M 1/113; C05F 17/00; C05F 17/02
[52] U.S. Cl. .......... 435/312; 435/316; 220/9.3; 220/666; 220/908; 422/184
[58] Field of Search ................ 220/4.04, 4.12, 220/908, 9.1, 9.2, 9.3, 367, 372, 360, 315, 318, 252, 212.5, 666, 668, 669, 673, 694, DIG. 13, DIG. 8; 435/287, 299, 312, 316, 302, 303, 304, 305, 306; 423/DIG. 18; 248/318, 346, 671, 907; 422/184

[56] References Cited

U.S. PATENT DOCUMENTS

| | | | |
|---|---|---|---|
| D. 248,611 | 7/1978 | Dingwall | D7/194 |
| 887,098 | 5/1908 | Klein et al. | 220/212.5 |
| 2,899,110 | 8/1959 | Parker | 222/215 |
| 3,845,939 | 11/1974 | Waldenville | 259/10 |
| 3,951,294 | 4/1976 | Wilson | 220/5 R |
| 4,105,412 | 8/1978 | Petzinger | 23/259.1 |
| 4,108,609 | 8/1978 | Petzinger | 23/259 |
| 4,382,733 | 5/1993 | Rodgers | 410/49 |
| 4,917,254 | 4/1990 | Ciriacks | 220/1 T |
| 5,033,520 | 7/1991 | Kuehmichel | 141/231 |
| 5,244,804 | 9/1993 | Horkan et al. | 435/299 |

Primary Examiner—William H. Beisner
Assistant Examiner—Jane Williams

[57] ABSTRACT

A compost chamber includes a substantially cylindrical casing extending from a first cap closing an inlet end thereof to a second cap closing an outlet end thereof, the caps having a door therein for receiving and removing compost materials therethrough, respectively. The casing is pleated in a continuous spiral about a longitudinal axis thereof substantially from the inlet end to the outlet end. Thus, the casing is collapsible and expandible by folding and unfolding, respectively, of at least one of the pleats. Furthermore, when the casing is rotated about its longitudinal axis, the compost materials contained therein are transferred from the inlet end toward the outlet end.

13 Claims, 1 Drawing Sheet

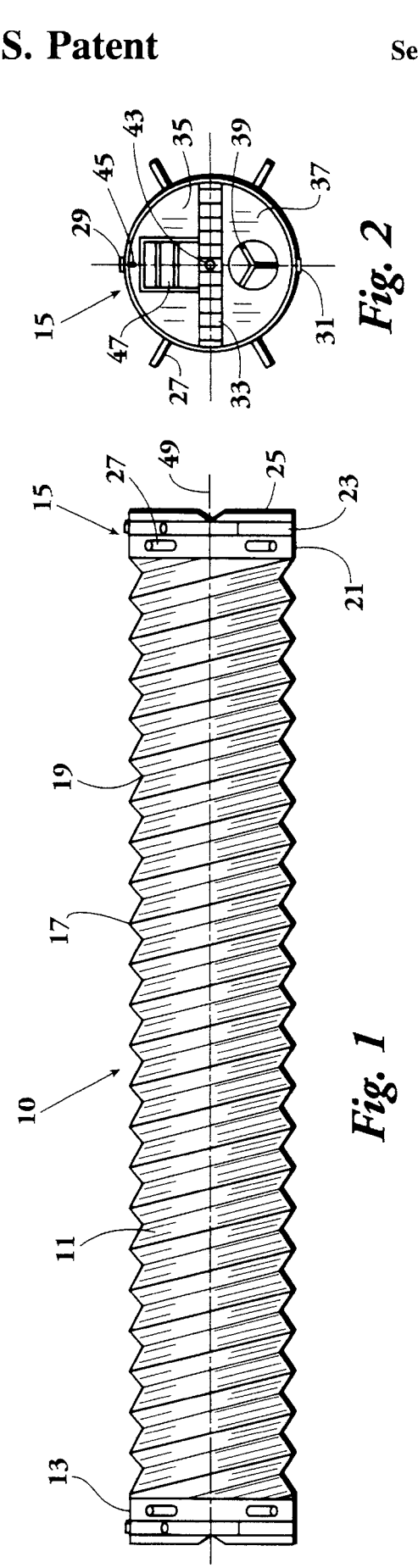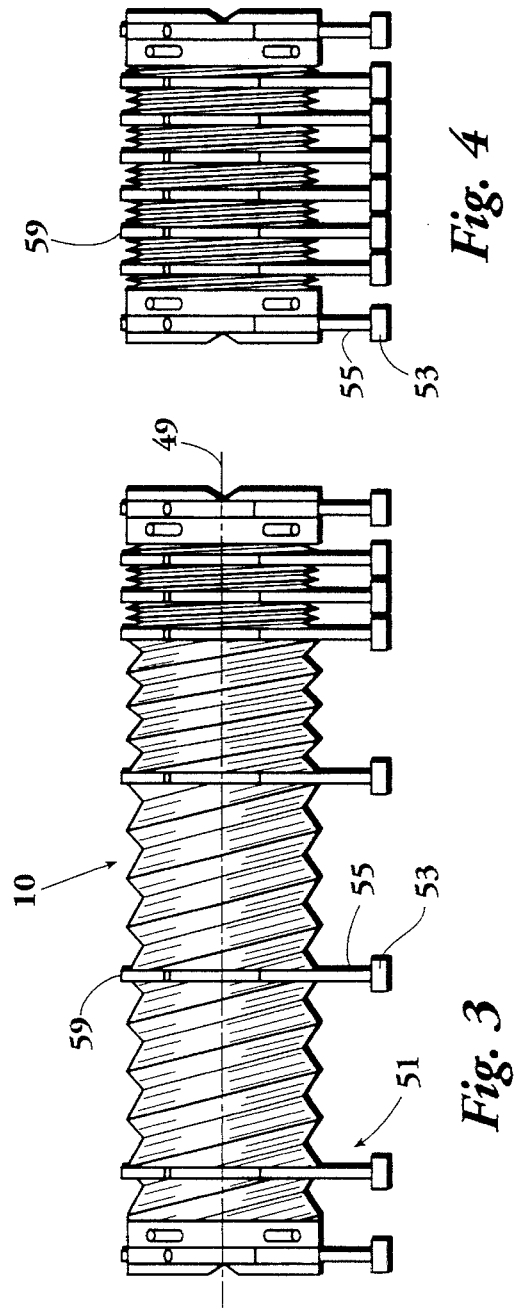

COMPOST CHAMBER

BACKGROUND OF THE INVENTION

This invention relates generally to land fertilization materials and more particularly concerns equipment for making compost from various decaying organic substances.

Compost for fertilizing land may consist of a variety of decaying organic substances such as dead leaves, manure and the like. Many backyard gardeners form their own compost by piling dead leaves and grass clippings in a yard area where a combination of moisture and solar heat will hasten the decay process. The odor and appearance of these compost piles are accepted as trade-offs against improved fertilizing of the garden soil. Under the best of natural heat and moisture conditions, the decaying process is a lengthy one and the intrusion on space and sensory organs is continuing. Furthermore, as new materials are added to the top of the compost pile, the more decayed compost progresses further to the bottom, necessitating no small amount of time, energy and tools in its collection.

It is, therefore, an object of this invention to provide a compost chamber which hastens the decay of compost materials. Another object of this invention is to provide a compost chamber which eliminates the unsightly appearance of the decaying materials and minimizes the escape of odors therefrom. It is also an object of this invention to provide a compost chamber which facilitates the introduction of moisture throughout the decaying material. It is another object of this invention to provide a compost chamber which facilitates the concentration of heat within the decaying materials. A further object of this invention is to provide a compost chamber which permits control of the air and moisture applied to the decaying materials. Yet another object of this invention is to provide a compost chamber which affords ready access to the more decayed compost materials contained therein. It is also an object of this invention to provide a compost chamber which facilitates loosening and mixing of the materials contained therein with minimal intermixing of newer and older decaying materials. Another object of this invention is to provide a compost chamber which is fully collapsible to a relatively small size for storage. And it is an object of this invention to provide a compost chamber that may be partially collapsed to conform its volume to the volume of its contents, thus minimizing the yard area used by the chamber.

SUMMARY OF THE INVENTION

A compost chamber includes a substantially cylindrical casing extending from a first cap closing an inlet end thereof to a second cap closing an outlet end thereof, the caps having a door therein for receiving and removing compost materials therethrough, respectively.

The casing is pleated in a continuous spiral about a longitudinal axis thereof substantially from the inlet end to the outlet end. Thus, the casing is collapsible and expandible by folding and unfolding, respectively, of at least one of the pleats. Furthermore, when the casing is rotated about its longitudinal axis, the compost materials contained therein are transferred from the inlet end toward the outlet end.

A plurality of handles spaced apart on and extending radially outwardly from at least one of the caps facilitates rotation of the chamber. A fitting extending through at least one of the caps connects at one end with a length of soaker hose in the chamber and at the other end to a water source. In one preferred embodiment, each of the caps has a fitting therethrough so that the soaker hose can be connected therebetween and has a cover used to close the end not connected to the water source. The fittings are preferably aligned substantially along the longitudinal axis of the chamber. A drain hole is also provided through at least one of the caps proximate the periphery thereof. At least one of the end caps preferably consists of a ring fixed to its respective end of the casing and a cover including a hinge extending diametrically across the cap and journalled for rotation within the ring and a semicircular door and a semicircular panel connected on either side of the hinge. A handle extends outwardly from the cover to facilitate rotation of the cover in the ring. A semicircular screen is mounted in the ring inwardly of the cover for alignment with the door when the cover is rotated.

Preferably, the ring is fixed to the casing by a second hinge whereby the axial center of the ring is rotatable about a second axis parallel to the longitudinal axis of the casing. A latch mounted on the ring approximately diametrically opposite the second hinge permits detachable securing of the ring to the casing in a closed condition.

The chamber may further include a plurality of supports spaced apart beneath the casing, each support having a lower portion adapted to stand on the ground and an upper portion having an approximately semicircular seat in a plane transverse to the casing axis. A plurality of sleeves, one journalled for rotation in each of the seats, is concentrically fixed to the exterior of the casing so that the casing is rotatable about its longitudinal axis. A further pair of supports may be provided at each end cap.

BRIEF DESCRIPTION OF THE DRAWINGS

Other objects and advantages of the invention will become apparent upon reading the following detailed description and upon reference to the drawings in which:

FIG. 1 is a side elevation view of a preferred embodiment of the compost chamber;

FIG. 2 is an end elevation view of the compost chamber of FIG. 1;

FIG. 3 is a side elevation view of a preferred embodiment of the compost chamber in a partially collapsed condition and supported above the ground;

FIG. 4 is a side elevation view of the compost chamber of FIG. 3 in its fully collapsed condition; and FIG. 5 is an end elevation view of the compost chamber of FIG. 3.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, a compost chamber 10 is illustrated consisting of an elongated spiral casing 11 having end caps 13 and 15 forming a completely closed substantially cylindrical chamber. The spiral casing 11 is preferably formed of a flexible polycarbonate of configuration substantially similar to the thread of a bolt having a crest 17 and a root 19 continuously spiraled and extending from one end cap 13 to the other end cap 15. Thus, the casing 11 may be folded to collapse or unfolded to expand along its crest 17 and its root 19 to any desired length.

The end caps 13 and 15 are preferably, though not necessarily, identical. As shown in FIG. 2, the end cap 15 preferably consists of a fixed rim 21, a swinging rim 23 and a rotating cover 25. The fixed rim 21 is a substantially rigid circular band permanently fixed to the end of the casing 11. A plurality of handles 27 extend radially outwardly from the fixed rim 21 at suitable intervals to permit manual rotation of the fixed rim 21 and therefore of the casing 11 about its longitudinal axis 49. The swinging rim 23 is also a substantially rigid circular band and is connected proximate a point on its circumference to the fixed rim 21 proximate a point on its circumference by an axle pin hinge 29 so that the swinging rim 23 may be rotated about the hinge 29 into and out of alignment with the fixed rim 21. As shown, a latch 31 mounted on the swinging rim 23 proximate its circumference and diagonally opposite the hinge 29 is engagable with the fixed rim 21 to secure the swinging rim 23 in its aligned or closed condition relative to the swinging rim 23. A second hinge 33 is diametrically and rotatably mounted in the swinging rim 23. An apparently semi-circular door 35 and an approximately semi-circular panel 37 mounted on the diametric hinge 33 close the end of the spiral casing 11. The door 35 may, for example, snap lock or friction fit with the rotating cover 25 so as to be secured in the closed condition. Preferably, the door 35 and the panel 37 will be beveled along their edges connected to the diametric hinge 33 so as to permit approximately ninety degrees rotation of the door 35 to an open condition. As shown, the panel 37 may be provided with a handle 39 so as to facilitate manual rotation of the cover 25 within the swinging rim 23. The panel 37 may also be provided with another handle 41 for purposes to be hereinafter explained. A soaker hose fitting 43 preferably extends through the center of the rotating cover 25. A drain hole 45 is provided through the rotating cover 25 proximate the outer periphery thereof. Preferably, a semi-circular screen 47 is mounted in the swinging rim 23 proximate the inside surface of the rotating cover 25.

In operation, the compost chamber 10 is transported to its desired location by use of the handles 27 or 41 on the end caps 13 and 15. The chamber 10 is then expanded to its desired length by pulling either end cap 13 or 15 away from the other end cap 15 or 13 to open a number of folds in the casing 11. With the casing 11 opened to its desired length, the semi-circular door 35 at the input end of the compost chamber 10, preferably in the upward position, is opened to permit introduction of new compost materials into one end of the compost chamber 10. The cover 25, if necessary, can be rotated within the swinging rim 23 so as to align the panel 37 with the screen to permit the introduction of the material into the casing 11 through the door 35. Once the compost material has been introduced into the casing 11, the door can be closed and the loading process is complete. If, after a period of time, it is desired to add new compost materials to the chamber 10, the chamber 10 is rotated about its horizontal axis 49, preferably by use of the handles 27 provided on the fixed rim 21. As the chamber 10 is rotated, the threaded configuration of the casing 11 causes the old compost materials contained in the chamber 10 to gravitationally fold and mix with each other and to gradually move toward the opposite end of the casing 11, the casing 11 functioning as a worm screw conveyor for transporting the materials from one end to the other. Thus, as new compost materials are added from time to time at one end of the chamber, the rotation of the chamber 10 about its horizontal axis 49 causes the older compost materials to be transferred toward the opposite end of the chamber 10. Thus, the compost materials will be broken up and loosened by the rotation of the chamber 10 but, as the older materials are transported away from the entry end of the newer compost materials, there is no substantial intermixing of the new and old compost materials. When it is desired to remove compost from the chamber 10, the door 35 at the removal end of the chamber 10 will be opened to provide access to the compost. At any time, the length and therefore the volume of the compost chamber 10 can be changed by simply expanding or collapsing a number of folds in the spiral casing 11. If greater access to the chamber 10 is desired, the end caps 13 and 15 may be opened by disconnection of the latch 31 and rotation of the swinging rim 23 in relation to the fixed rim 21 about the axle pin hinge 29. When the compost chamber 10 is being set up in the yard, a coil of soaker hose (not shown) can be connected between the soaker hose fittings 43 in the end caps 13 and 15. One soaker hose fitting 43 may then be capped and the other soaker hose fitting 43 connected to a suitable water supply to permit soaking of the compost materials in the chamber 10 under the control of the gardener. The screens 47 in the end caps 13 and 15 may also be positioned so that, as the door 35 in the end cap 13 or 15 is opened to a selected position, the gardener can also control the flow of air through the chamber 10. Preferably, the casing 11 will be dark green and translucent so as to readily blend in with the overall garden appearance and to permit the gardener to view its contents. A typical compost chamber 10 might range from 24 inches in diameter and 12 feet in fully expanded length for typical home gardening use to as much as 8 feet in diameter and 50 feet in fully expanded length for commercial applications.

Turning now to FIGS. 3, 4 and 5, the compost chamber 10 is further illustrated in conjunction with a plurality of supports 51 elevating the chamber 10 above ground. Each of the supports 51 consists essentially of a horizontal foot 53 extending transversely with respect to the horizontal axis 49 of the chamber 10 and a substantially flat leg portion 55 extending upwardly from the foot 53 and having a more than semi-circular seat 57 in the upper end thereof. A sleeve 59 has an interior periphery contoured to the cross-section of the spiral casing 11 or the end cap 13 or 15 taken along a plane transverse to the horizontal axis 49 of the casing 11 and a circular outer periphery for rotation within the seat 57 about the casing horizontal axis 11.

The supports 51 will preferably be displaced longitudinally along the casing 11 at substantially equal intervals and, preferably at intervals approximately equal to the diameter of the casing 11. The height of the leg 55 may be such as to support the bottom of the casing 11 from six inches to three feet above ground. The width of the foot 53 of each support 51 as measured in the direction of the longitudinal axis 49 of the casing 11 is such that, when the chamber 10 is partially collapsed as shown in FIG. 3 or fully collapsed as shown in FIG. 4, the feet 53 will not prevent maximum collapse of the folds in the casing 11.

The operation of the compost chamber 10 with the supports 51 remains the same as earlier disclosed except that, in the rotation of the chamber 10, the chamber 10 remains in its established position relative to the ground and need not be shifted back to its original position after rotation. Furthermore, possible damage to ground cover in rolling the chamber 10 is eliminated and maintenance of the ground cover beneath the chamber is facilitated.

Thus, it is apparent that there has been provided, in accordance with the invention, a compost chamber that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A compost chamber comprising:

a substantially cylindrical casing;

a first cap closing an inlet end of said casing, said cap having a door therein for receiving compost materials therethrough; and a second cap closing an oulet end of said casing, said outlet cap having a door therein for removing compost materials therethrough;

said casing having in a continuous spiral of pleats about a horizontal longitudinal axis thereof substantially from said inlet end to said outlet end whereby said casing is collapsible and expandable by folding and unfolding, respectively, of at least one of said pleats and whereby, when said casing is rotated about said axis, said compost materials contained therein are transferred from said inlet end toward said outlet end.

2. A compost chamber according to claim 1 further comprising a plurality of handles spaced apart on and extending radially outwardly from at least one of said caps.

3. A compost chamber according to claim 1 further comprising a fitting extending through at least one of said caps for connection at an interior end thereof with a length of soaker hose and at an exterior end thereof to a water source.

4. A compost chamber according to claim 3, each of said caps having a fitting therethrough, said soaker hose being connected therebetween to said interior ends, further comprising a cover closing said exterior end not for connection to said water source.

5. A compost chamber according to claim 4, said fittings being aligned substantially along said longitudinal axis.

6. A compost chamber according to claim 1 further comprising a drain hole through at least one of said caps proximate the periphery thereof.

7. A compost chamber according to claim 1, at least one of said end caps comprising:

a ring fixed to its respective end of said casing;

a cover comprising a hinge extending diametrically across said at least one cap and journalled for rotation within said ring, said door being a substantially semicircular panel connected to one side of said hinge, and a substantially semicircular panel connected to the other side of said hinge.

8. A compost chamber according to claim 7, said cover having a handle extending outwardly therefrom for rotating said cover in said ring.

9. A compost chamber according to claim 7 further comprising a semicircular screen fixed within said ring and inwardly of said cover whereby said door is rotatable into and out of alignment with said screen.

10. A compost chamber according to claim 7, said ring being fixed to said casing by a second hinge whereby the axial center of said ring is rotatable about a second axis parallel to said longitudinal axis of said casing.

11. A compost chamber according to claim 10 further comprising a latch mounted on said ring approximately diametrically opposite said second hinge for detachably securing said ring to said casing.

12. A compost chamber according to claim 1 further comprising:

a plurality of supports spaced apart beneath said casing, each said support having a lower portion adapted to stand on the ground and an upper portion having an approximately semicircular seat in a plane transverse to said casing axis; and a plurality of sleeves, one journalled for rotation in each of said seats, each said sleeve being concentrically fixed to the exterior of said casing, whereby said casing is rotatable about its longitudinal axis.

13. A compost chamber according to claim 12 further comprising:

a pair of supports, one disposed beneath each said cap, each having a lower portion adapted to stand on the ground and an upper portion having an approximately semicircular seat in a plane transverse to said casing axis; and a pair of sleeves, one journalled for rotation in each said seat of said pair of supports, each said sleeve of said pair of sleeves being concentrically fixed to the exterior of its respective cap.

\* \* \* \* \*